United States Patent [19]

Wiseman

[11] Patent Number: 4,875,573
[45] Date of Patent: Oct. 24, 1989

[54] WHEEL TURN AND HANGER BRACKET ASSEMBLY THEREFOR

[75] Inventor: John A. Wiseman, Lynchburg, Va.

[73] Assignee: Simplimatic Engineering Company, Lynchburg, Va.

[21] Appl. No.: 217,467

[22] Filed: Jul. 11, 1988

[51] Int. Cl.⁴ ............................................. B65G 21/16
[52] U.S. Cl. .................................... 198/831; 198/839; 198/842
[58] Field of Search ............... 198/831, 839, 842, 845, 198/860.1, 861.1

[56] References Cited

U.S. PATENT DOCUMENTS

| 2,690,834 | 10/1954 | Lundquist. | |
|---|---|---|---|
| 3,796,296 | 3/1974 | Bakker. | |
| 4,164,283 | 8/1979 | Flajnik | 198/831 X |
| 4,270,654 | 6/1981 | Braun et al. | 198/839 X |
| 4,361,219 | 11/1983 | Aldridge et al.. | |
| 4,518,079 | 5/1985 | Paelke | 198/864 |
| 4,618,057 | 10/1986 | Howser | 198/861.2 |
| 4,732,268 | 3/1988 | Sjostrand | 198/831 |

OTHER PUBLICATIONS

SKF Flex-Link, Publication 3528U 4000 Jan. 1987.

Primary Examiner—Robert J. Spar
Assistant Examiner—Lyle K. Kimms
Attorney, Agent, or Firm—St. Onge Steward Johnston & Reens

[57] ABSTRACT

A wheel turn bracket assembly is provided for an article conveying system for coupling inbound and outbound tracks of a moving surface conveyor to inbound and outbound sides respectively of a wheel turn at an angle between said tracks that can be adjustably selected depending upon the angle of the desired turn.

6 Claims, 4 Drawing Sheets

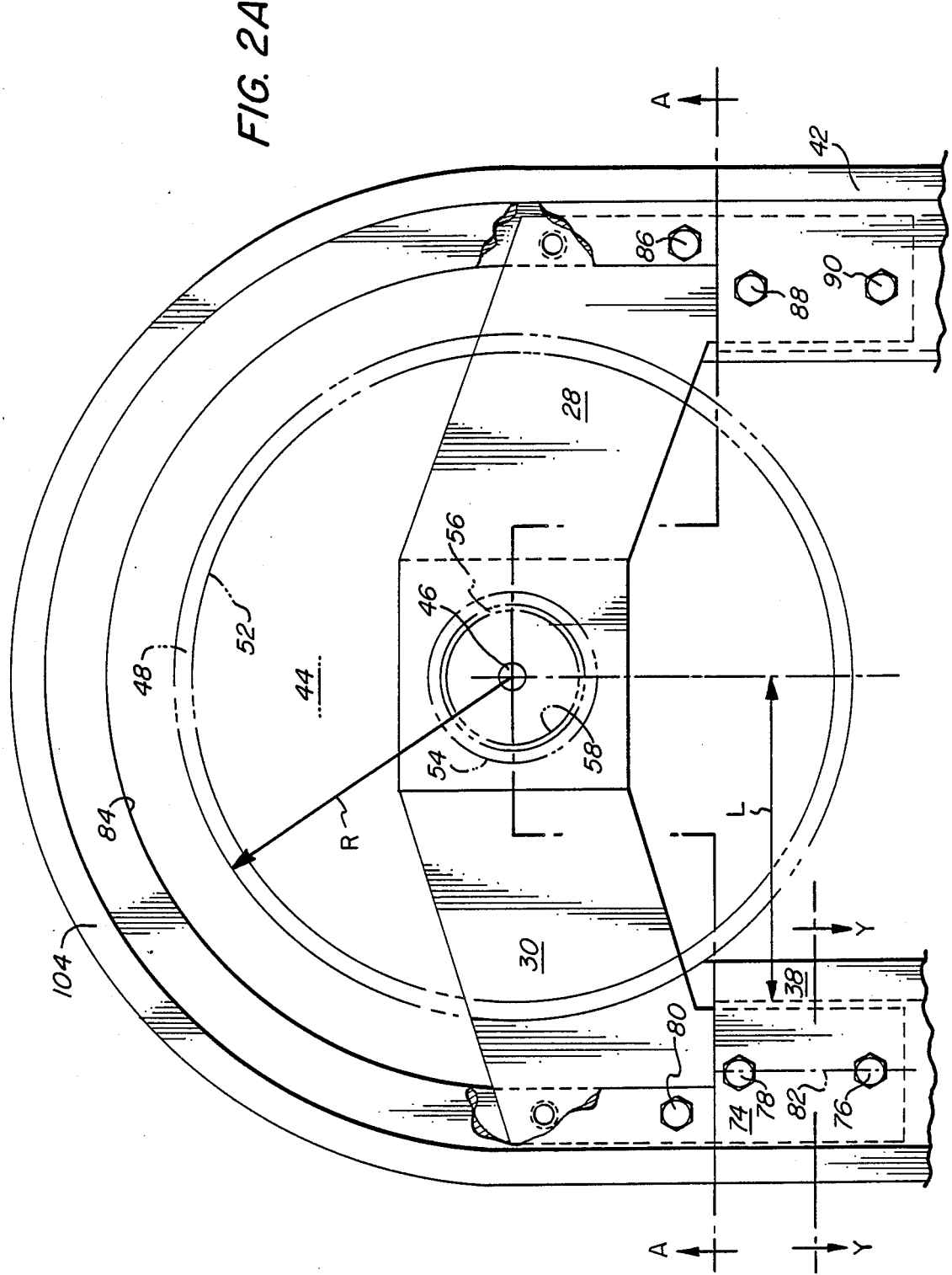

WHEEL TURN AND HANGER BRACKET ASSEMBLY THEREFOR

FIELD OF THE INVENTION

The present invention relates to a wheel turn and a hanger bracket assembly therefor for an article conveying system. More particularly, a pair of bracket members are provided for coupling a wheel turn to inbound and outbound tracks of said turn, which brackets can be used to couple said wheel turn to said tracks regardless of the angle between said inbound and outbound tracks.

BACKGROUND OF THE INVENTION

Wheel turns, or live turns, for article conveying systems are known in the art. Such conveying systems typically comprise at least one track along which an endless article conveying surface moves. Wheel turns are necessary because they are conveyor designs where a simple bend or friction turn is inadequate to permit the conveying surface, usually a chain, to move smoothly through the turn to thereby change the direction of the conveyor track path. In such a situation, a wheel rotatably about an axle is mounted in said turn to guide the chain through the turn, the wheel being free to rotate under the influence of the moving chain. The wheel turn converts a friction bearing surface on the inside of the turn to a rotating bearing surface.

Because it is necessary to connect the wheel turn to both inbound and outbound tracks to the turn, the orientation of which may vary depending upon the relative positions of the two tracks, the coupling devices may be different depending upon the angle of the wheel turn. For example, different coupling devices may be needed for a 90° turn as opposed to a 30° turn.

SUMMARY OF THE INVENTION

In accordance with the present invention, a turn hanger bracket assembly is provided, which includes a pair of substantially identical brackets that can be used to couple a wheel turn to the inbound and outbound tracks regardless of the angle of the turn. The bracket of the preferred embodiment is an L-shaped member having a first leg with a bore in it for rotatably fitting over the wheel turn axle. This first leg has a length corresponding to the wheel diameter. A second leg is joined to said first leg at the end opposite the bore end. The second leg is at substantially a right angle to said first leg. Because the length of the first leg corresponds to the wheel diameter, the second leg will therefore be substantially aligned with or parallel to a tangent to the wheel, regardless of how the bracket is rotatably adjusted about the axle. Therefore, if the other L-shaped member of the bracket pair is flipped and also positioned with its bore over the axle, the second leg of the other bracket will also be aligned in a tangential fashion but will point in an opposite direction. The bracket pair can then be rotatably adjusted about the axle to accommodate any desired angle between the two second legs, which are connected to the inbound and outbound tracks.

It is an object of the present invention to provide a wheel turn hanger bracket assembly that can be readily adjusted to accommodate any wheel turn angle.

It is an object of the present invention to provide a single wheel turn hanger bracket that can be combined in pairs to provide a wheel turn hanger bracket assembly.

It is an object of the present invention to provide a wheel turn that can be used to provide a continuum of angles within a relatively broad range.

It is an object of the present invention to provide a wheel turn hanger bracket for use with a modular conveyor system.

Further objects and advantages of the present invention will become apparent from the following description of the drawings and the preferred embodiments.

BRIEF DESCRIPTION OF THE DRAWINGS

FIGS. 2A and 2B show a top view and accompanying side view respectively in partial cross-section of the wheel turn and wheel turn hanger brackets of the present invention;

DETAILED DESCRIPTION OF THE PREFERRED EMBODIMENT

Figure 1:
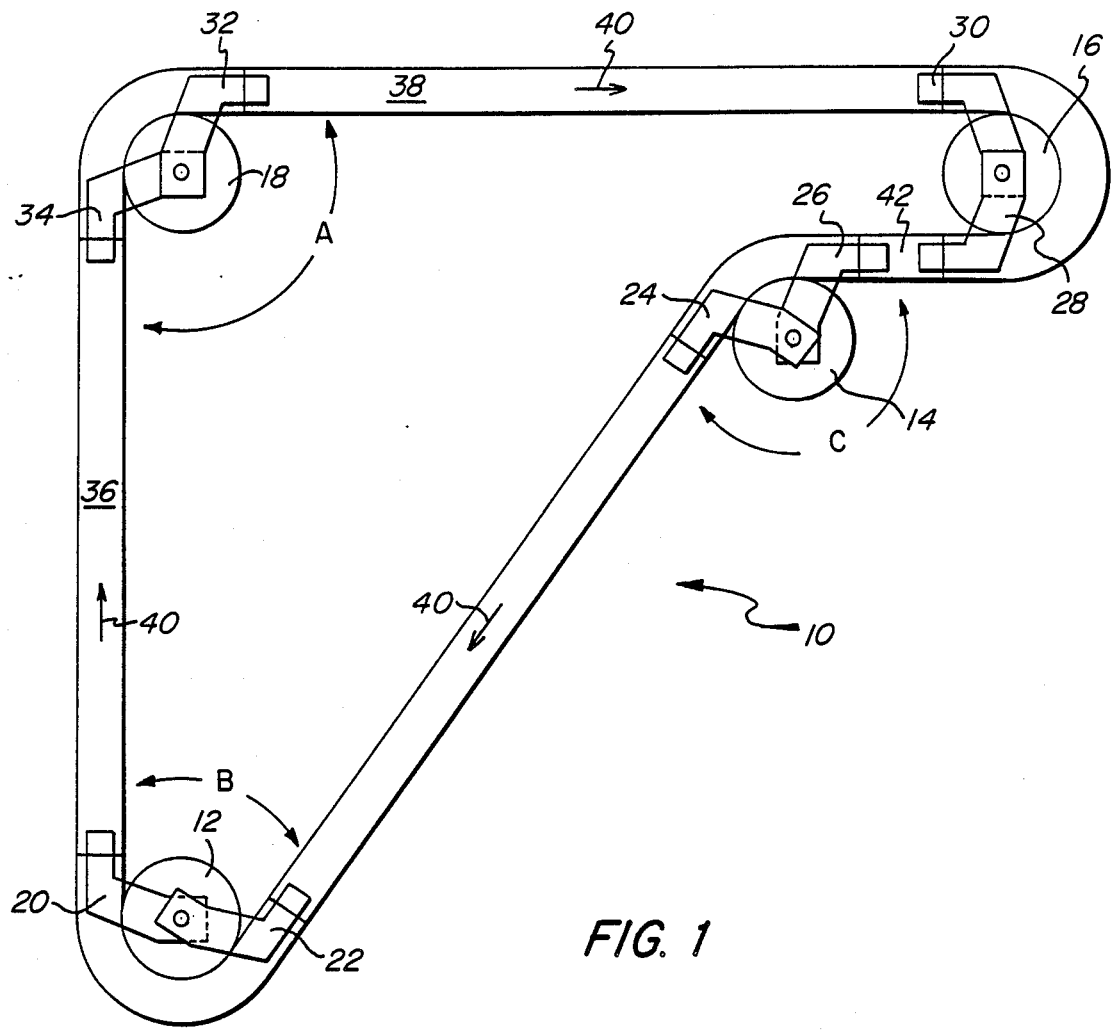
FIG. 1 shows a schematic diagram of a conveyor system layout using the wheel turns and the wheel turn hanger brackets of the present invention.

FIG. 1 shows at 10 an example of a conveyor system layout using the wheel turns 12, 14, 16, and 18 of the present invention, along with four wheel turn hanger bracket pairs 20 and 22, 24 and 26, 28 and 30, and 32 and 34 of the present invention. It is understood that this particular system layout 10 is by way of example only, as virtually an unlimited number of system layouts or configurations can be achieved. It is further understood that, while FIG. 1 shows only horizontal curves, the bracket assembly of the present invention can be used in vertical curves as well.

Wheel turn 18 is a 90° turn, in that turn 18 joins track sections 36 and 38 at a 90° angle A when viewed from inside the conveyor path loop. The conveyor path is shown as being clockwise as indicated by arrows 40, thereby making track section 36 the inbound track for wheel turn 18 and track section 38 the outbound track. It is understood that the terms "inbound" and "outbound" are for convenience only when described a particular wheel turn and are not meant to limit the present invention. For example, track 36 is the inbound track for turn 18, but is the outbound track for turn 12.

Wheel turn 12 is approximately a 40° turn as defined by angle B; wheel turn 14 is approximately a 140° turn as defined by angle C; and wheel turn 16 is a 180° turn in that the turn effectively reverses the direction of the conveyor path.

Each wheel turn is coupled to inbound and outbound tracks, such as for example turn 16 is connected to tracks 38 and 42 by the turn hanger brackets 30 and 28 of the present invention. Tracks 38 and 42 are typically supported by legs or other mounting means (not shown) on the floor or other supporting surface of the environment where the conveyor is installed. Turn 16 must be coupled to tracks 38 and 42 for proper support thereby.

In a modular conveyor system it is particularly desirable for the same basic wheel turn to be readily usable at turn 12, turn 14, turn 16, turn 18, or some other turn regardless of the angle. It is seen in FIG. 1 that a wheel turn bracket pair is used at each turn, and that each bracket pair is adjustable to accommodate a wide range of angles.

Figure 2B:
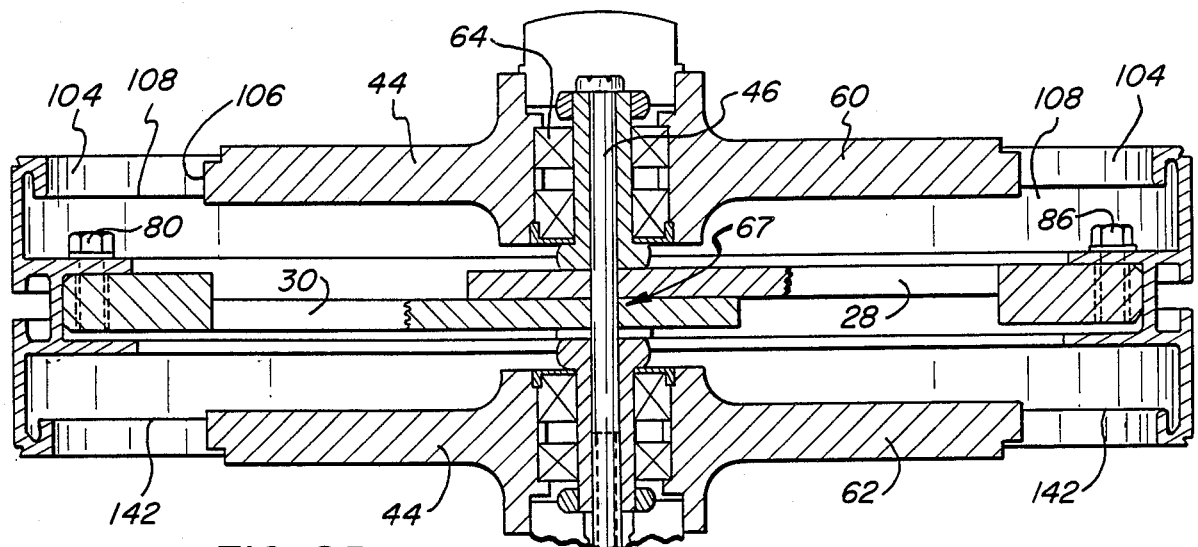

By way of example only of the preferred embodiment, the wheel turn 16 and turn hanger brackets 28 and 30 are shown in more detail in FIGS. 2A and 2B, which show top and partial cross-sectional views along line A—A, respectively.

Figure 3A:
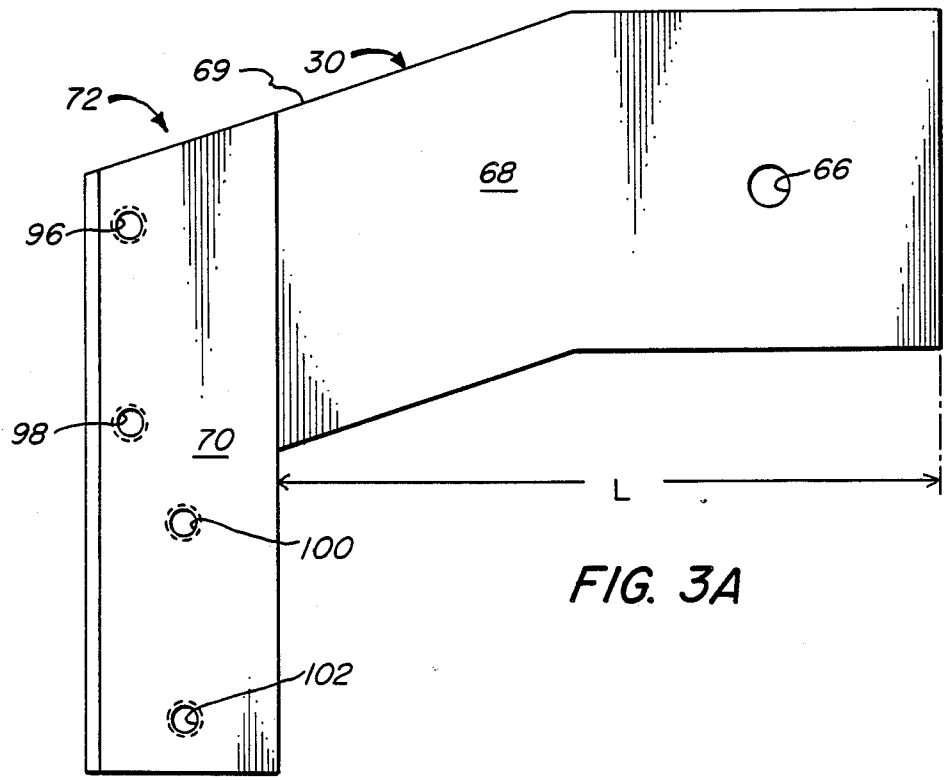
FIGS. 3A and 3B show a top and accompanying side view respectively of one wheel turn hanger bracket of the present invention.

FIG. 2A shows wheel 44 mounted on axle bolt 46 for rotation thereabout. Wheel 44 is shown largely in phantom as indicated by broken lines 48, 52, 54, 56, and 58 showing the outlines of various surfaces of the wheel. This is to more clearly show the details of the turn hanger bracket of the present invention. One member 30 of the bracket pair is shown in even further detail in FIGS. 3A and 3B. The other member 28 is identical but in a flipped position when installed, as shown in FIG. 2B.

As seen in FIG. 2B, wheel 44 has an upper disk 60 and a lower disk 62 held together by axle bolt 46 with the two bracket members 28 and 30 clamped therebetween. The lower disk 62 is for a lower chain raceway that may or may not be used in a specific application, such as for example as a chain returnway. Because the lower disk 62 is essentially the same as upper disk 60, the detailed description herein will be confined to disk 60.

Wheel 44 rotates on axle bolt 46 with suitable routine mounting and bearing means shown generally at 64. Axle bolt 46 passes through bore 66 in bracket 30 and a matching bore in the other member of the pair 28. This bore 66 is sized so that the bracket is relatively free to turn about axle bolt 46, which clamps the two members 28 and 30 together at their common pivot point 67 to lock up once in position at the desired angle. Because the bracket pair is rotatable about axle 46 when bracket 30 is positioned thereon, as shown in FIG. 2B, and bracket 28 is also positioned thereon but in a flipped orientation, the bracket pair can be rotatably adjusted to accommodate a wide range of wheel turn angles as depicted in FIG. 1 above.

Bracket 30 is preferably substantially L-shaped and has a first leg portion 68 and a second leg portion 70 at substantially a right angle thereto to form an elbow member indicated generally at 72. The first leg portion 68 has a length L that substantially corresponds to the radius R of wheel 44, such that when the end 74 of track 38 is coupled to leg 70 by means of bolts 76, 78, and 80 in alignment therewith, the centerline 82 of track 38 is parallel to a tangent to the wheel 44 and is also aligned with the centerline 84 of the turn. Bracket 28 is likewise joined to track 42 in matching alignment by bolts 86, 88, and 90.

Figure 3B:
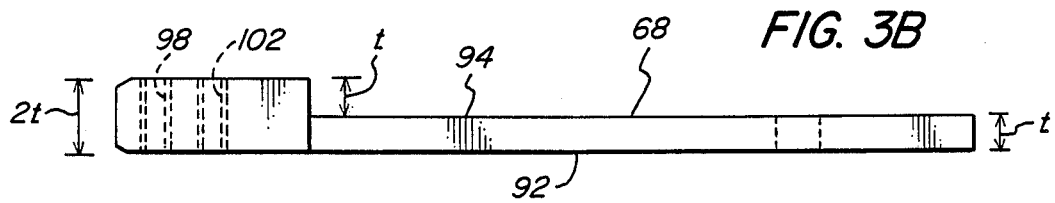

As seen by reference to FIG. 3B, in the preferred embodiment bracket 30 has a substantially plate-like shape. First leg 68 has a thickness t. First leg 68 also has an offset or slightly angled portion 69 to extend second leg 70 somewhat towards the track and away from the turn. Second leg 70 has double the thickness, or 2t. Legs 68 and 70 are aligned along first side 92, but the thicker second leg 70 protrudes from the opposite side 94 of leg 68 by a thickness t. Accordingly, as can be seen in FIG. 2B, when the pair of brackets 30 and 28 are flipped with respect to each other and placed with their opposite sides 94 touching adjacent axis 46, the second legs lie in substantially the same plane such that the mounting bolts such as 80 and 86 can affix tracks 38 and 42 to the wheel turn in the same plane, which is also parallel to the same plane in which the wheel 44 rotates. Second leg 70 has threaded holes 96, 98, 100, and 102 for receiving bolts as described above to couple the tracks 38 and 42 thereto.

The wheel 44 can be made of any suitable material such as for example aluminum, and the bracket member 30 can be made of any suitable material such as for example aluminum.

The wheel turn 16 also has a collar 104 seen in FIG. 2A, which is aligned with and follows the curve of wheel 44 around the turn. The collar 104 provides the outer track of the conveyor path, while the shaped edge 106 of the wheel 44 provides in effect the inner track. A raceway 108 is defined therebetween for receiving the conveying surface, preferably a chain, with the raceway being aligned with the centerline 84 of the turn.

Figure 4:
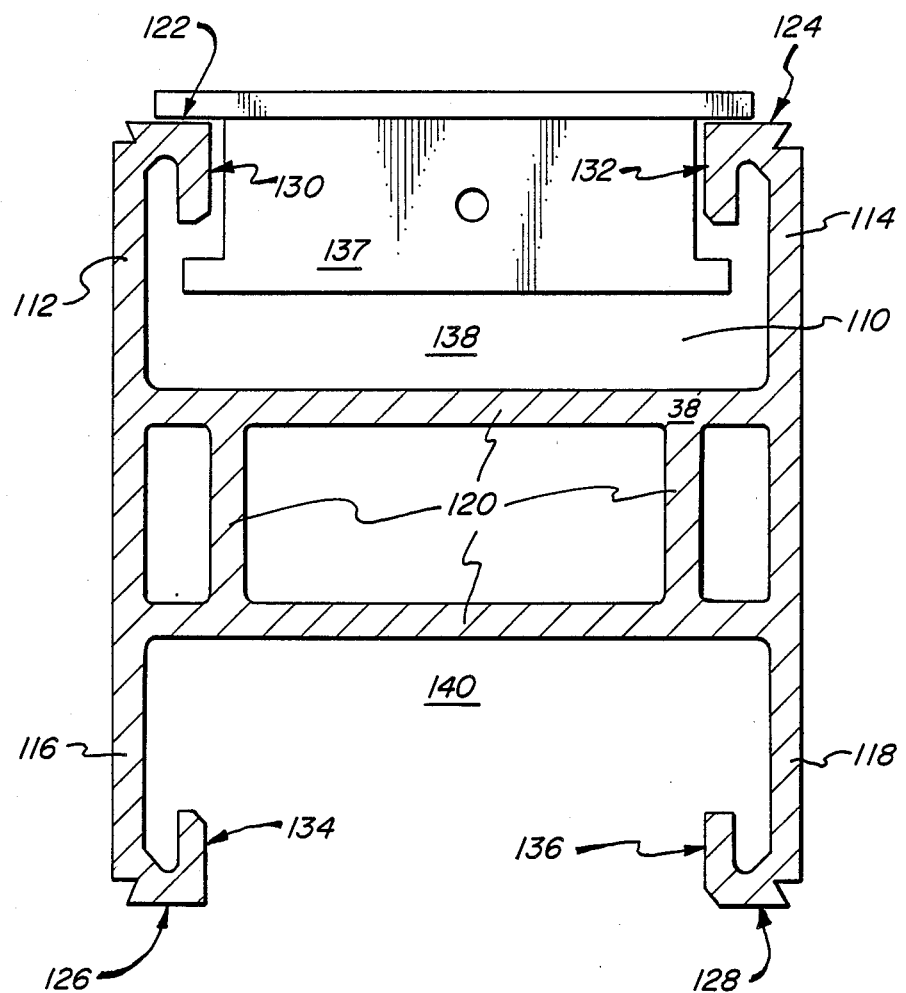
FIG. 4 shows a cross-section of the preferred embodiment of the conveyor track used in conjunction with the present invention.

The wheel turn 16, including the collar 104 and wheel 44, mates with tracks 38 and 42 as represented by the conveyor beam or track section 38 shown in cross-section in FIG. 4, which depicts the view taken at y—y in FIG. 2A. The cross-section 110 of track 38 show upper guide rails 112 and 114 and lower guide rails 116 and 118 joined by a center web 120. Beam or track section 38 is preferably formed of extruded aluminum, but any other suitable material such as steel or cast aluminum may also be used.

Rails 112, 114, 116, and 118 have guide surfaces 122, 124, 126, and 128 and opposed inner edges 130 and 132 as well as 134 and 136 for guiding the chain shown at 137 along the raceways 138 and 140 defined thereby. Raceway 138 connects with raceway 108, while raceway 140 connects with the raceway 142 in the lower part of the wheel turn.

It should be understood that various changes and modifications to the preferred embodiments described above will be apparent to those skilled in the art. Such changes and modifications can be made without departing from the spirit and scope of the present invention, and it is therefore intended that such changes and modifications be covered by the following claims.

I claim:

1. A wheel turn bracket assembly for an article conveying system for coupling inbound and outbound tracks of a moving surface conveyor to inbound and outbound sides respectively of a wheel turn at an angle between said tracks that can be adjustably selected depending upon the angle of the desired turn, said wheel turn including a wheel rotatable about an axle to guide at least a section of said moving surface through said turn along a turn centerline concentric with said wheel, said bracket assembly comprising a pair of substantially identical, L-shaped bracket members, each said bracket member having a first leg with a length approximately corresponding to the radius of said wheel and forming a bore therein adjacent one end of said first leg for receiving said axle, said bore being sized to mate with said axle in a rotatable relationship, each said bracket member further having a second leg formed at approximately a right angle to said first leg, said second leg having means for coupling to an end of one of said tracks, the first leg length being such that when said bore is positioned around said axle and said track end is coupled to said second leg, said track end is positioned adjacent said wheel in substantial alignment with the turn centerline at said point and the centerline of said track is aligned with the centerline of said turn, said pair of brackets being positionable with one bracket in a first orientation and the second bracket in a flipped orientation with said bores thereof aligned to fit around said axle and extend said second legs of said brackets outwardly on opposite sides of the turn to receive said inbound and outbound tracks in approximate alignment with the centerline of said turn, the bracket member pair being rotatably adjustable independent of each other around said axle to provide a selected angle between said inbound and outbound tracks.

2. The wheel turn bracket assembly of claim 1 wherein said inbound and outbound tracks near their ends adjacent said wheel lie in substantially the same plane, each of said tracks including a pair of opposed conveyor guide rails having outer surfaces and opposed inner edges separated by an open gap to form a raceway therebetween extending along the centerline of said track for receiving a conveying surface supported over said gap adjacent the outer surfaces of the guide rails, said wheel axle being perpendicular to the plane defined by said inbound and outbound legs, the outer edge of said wheel defining an inner guide surface for that portion of the conveyor path passing through the wheel turn, and a corresponding outer guide surface being defined by a curved rail section, the curvature of which corresponds to said wheel and the length of which depends on the angle of the wheel turn.

3. The wheel turn bracket assembly of claim 2, wherein each said bracket member is platelike and has a first side and an opposite side, said first leg having at least a portion thereof adjacent said bore having a thickness t, said second leg having at least a portion thereof having a thickness of 2t, said second leg being aligned with said first leg along said first side and said second leg extending outwardly from the opposite side from said first leg by a distance t, said second leg having means for coupling a selected one of said tracks thereto, a pair of said brackets being positionable in a flipped position with respect to each other with their respective bores aligned and said first legs abutting each other along at least a portion of their respective opposite sides, said coupling means of said second legs being aligned with each other and lying in substantially the same plane for coupling to said tracks lying in substantially the same plane.

4. The wheel turn bracket of claim 3, wherein said coupling means comprises at least one threaded hole in each of said second legs, said hole for receiving a bolt to clamp said track to said second leg, and said threaded hole in said first bracket member is aligned in the same plane as the second bracket member.

5. A wheel turn for an ariticle conveying system including a pair of conveyor tracks for connection to each other through said wheel turn at a selected angle between said tracks, said system further including an endless conveying surface for passing along one of said tracks through said wheel turn to the other of said tracks, said wheel turn comprising:

(a) a wheel rotatable about an axle, said wheel having a perimeter for guiding at least a section of said conveying surface along a curved path from said one track to said other track;

(b) a pair of substantially identical elbow members for connecting said wheel to said track pair in alignment therebetween at said selected angle between tracks, one elbow member for connecting one of said tracks in alignment with said curved path adjacent a first point on the perimeter of said wheel and the other elbow member for connecting the other of said tracks in alignment with said curved path at an opposite point on the perimeter of the wheel, each of said pair of elbow members having a first leg with a hole formed therein for slipping over said axle, each said elbow member further having a second leg having means for coupling to one of said tracks, such that when said bore is slipped over said axle and said track end is coupled to said second leg, said track end is positioned adjacent said wheel in substantial alignment with said path, said pair of elbow members being positionable with one member in a first orientation and the second member in a reversed orientation with said bores thereof aligned to slip over said axle and extend said second legs of said members outwardly in approximate tangential relationships to said wheel to couple to said two tracks in approximate alignment with the curved path, the elbow member pair being independently rotatably adjustable with respect to each other around said axle to provide a selected angle between said second legs and thereby between said tracks.

6. The wheel turn of claim 5, wherein said tracks include a pair of opposed conveyor guide rails having opposed inner edges separated by a gap extending along the centerline of said track for providing a raceway for said endless conveying surface, said wheel turn further comprising a collar concentric with said wheel but separated therefrom by a distance corresponding to said gap, said collar being aligned with said path and haing a length sufficient to extend from one said track around the turn to the other said track, and said wheel has a cylindrical face with a guide rail formed therein and said collar has a corresponding opposing guide rail formed therein to provide a continuation of said raceway through said wheel turn following said path, the length of said collar being determined by the angle between said tracks as further determined by the spacing of said elbow members about said axle.

* * * * *